Patented Apr. 19, 1949

2,467,544

UNITED STATES PATENT OFFICE 2,467,544

NICKEL-MANGANESE-SILVER ALLOY

Keith R. Whitcomb, San Diego, Calif.

No Drawing. Application January 3, 1947,
Serial No. 720,109

2 Claims. (Cl. 75—170)

My invention relates to a composition, more particularly to an alloy for use in brazing stainless steel or the like and the objects of my invention are:

First, to provide an alloy of this class which is substantially corrosion and heat resistant up to temperatures around 2000 degrees Fahrenheit;

Second, to provide an alloy of this class having excellent flowing characteristics whereby the brazing of stainless steel or the like is very readily accomplished;

Third, to provide an alloy of this class which re-melts at a considerably higher temperature than the initial brazing temperature thereof which is very desirable in the production of airplane exhaust systems or the like wherein high operating temperatures are apparent;

Fourth, to provide an alloy of this class which when used as a brazing medium equals the tensile strength of stainless steel tubing, telescopically overlapped, slightly more than double the wall thickness of the tubing; up to temperatures of 1600 degrees F.;

Fifth, to provide an alloy of this class which produces sound, dense and accurate castings which have a relatively high tensile strength and may be finished to a high lustre;

Sixth, to provide an alloy of this class which efficiently brazes together materials having a liberal range of spaced relationship to each other; and Seventh, to provide an alloy of this class which is very simple and economical of composition in proportion to its utility and which will not readily deteriorate or get out of order.

With these and other objects in view as will appear hereinafter, my invention consists of certain combinations as will be hereinafter described in detail and particularly set forth in the appended claims.

In producing my alloy, and in accordance with experimentation, it has been found that the best results are produced when the silver is between 4 and 10 per cent and the ratio of the per cent of nickel to the per cent of manganese is preferably between 2 and 3 with 2.5 to 2.7 being optimum. However, useful alloys may be produced when the silver is between 2 and 12 per cent and the ratio of the per cent of nickel to the per cent of manganese is between 1.5 and 4.5. One alloy representative of the best results obtained includes 61 per cent nickel, 30 per cent manganese and 9 per cent silver. Another alloy of very good characteristics includes 72 per cent nickel, 23 per cent manganese and 5 per cent silver. The first-mentioned alloy is characterized by having a lower flow temperature than the latter and a slightly lower shear strength at any given temperature, however the strength of the first-mentioned alloy is sufficiently strong when employed in brazed joints on stainless steel so that it will be stronger than the parent metal up to a temperature of approximately 1600 degrees Fahrenheit. This condition is apparent when employing overlapped joints substantially longer than the thickness of the material brazed together. The flow temperature of the first-mentioned alloy makes it a little more convenient for use in furnace brazing than the second-mentioned alloy. The second-mentioned alloy including 72 per cent nickel, 23 per cent manganese and 5 per cent silver is adaptable in applications where very high strength at extreme temperatures is desired. Its flow temperature is around 2200 degrees Fahrenheit and its re-melt temperature is in excess of 2200 degrees Fahrenheit. According to experimentation, the ultimate shear strength of the second-mentioned alloy is approximately 4000 pounds per square inch at 2000 degrees Fahrenheit and has an approximate shear strength of 70,000 pounds per square inch at room temperature. In operation, two pieces of stainless steel may be brazed together using either of the hereinbefore set forth alloys and the brazing process may be carried on in a furnace or as use of any other suitable means of heating and may be greatly facilitated by use of the following flux:

| Fuse: | Per cent |
|---|---|
| Sodium carbonate | 18.0 |
| Calcium oxide | 14.6 |
| Boric acid | 67.5 |

Pour this melt into cold water, dry, and mix with boric acid:

| | Per cent |
|---|---|
| Above frit | 81 |
| Boric acid | 19 |

Dry grind this mixture until 95% of it will pass through a 200 mesh sieve. For use, this dry powder is made into a paste with methyl alcohol (wood alcohol) or with water. The alcohol mixture is usually preferred because of its rapid drying qualities. The flux sets up to a hard, shock resistant mass on drying.

It will be here noted that my brazing alloy may be provided in wire form as a convenient arrangement for applying the brazing alloy to the parts before subjecting the same to brazing temperature.

Though I have described particular combinations of elements in certain proportions, I do not wish to be limited to the particular proportions, but desire to include in the scope of my invention the composition substantially as set forth in the appended claims.

Having thus described my invention what I claim as new and desire to secure by Letters Patent is:

1. A composition consisting of nickel and manganese in ratios varying between 2 to 1 and 3 to 1 respectively and silver ranging from 4 to 10 per cent of the composition.

2. A composition consisting of nickel, manganese and silver wherein the ratio of the nickel to the manganese is between 1.5 to 1 and 4.5 to 1, respectively, said silver ranging from 2 to 12 per cent of said composition.

KEITH R. WHITCOMB.

REFERENCES CITED

The following references are of record in the file of this patent:

UNITED STATES PATENTS

| Number | Name | Date |
| --- | --- | --- |
| 1,838,130 | Beckinsale | Dec. 29, 1931 |
| 1,910,309 | Smith | May 23, 1933 |
| 2,226,079 | Spanner | Dec. 24, 1940 |